United States Patent
Tanaka et al.

(10) Patent No.: US 9,922,558 B2
(45) Date of Patent: Mar. 20, 2018

(54) DRIVING SUPPORT DEVICE

(71) Applicant: FUJITSU TEN LIMITED, Kobe-shi, Hyogo (JP)

(72) Inventors: Shinichi Tanaka, Kobe (JP); Hironori Ichioka, Kobe (JP)

(73) Assignee: FUJITSU TEN LIMITED, Kobe-shi (JP)

(*) Notice: Subject to any disclaimer, the term of this patent is extended or adjusted under 35 U.S.C. 154(b) by 0 days.

(21) Appl. No.: 15/342,704

(22) Filed: Nov. 3, 2016

(65) Prior Publication Data

US 2017/0132924 A1    May 11, 2017

(30) Foreign Application Priority Data

Nov. 11, 2015 (JP) ................... 2015-221496

(51) Int. Cl.

| G08G 1/09 | (2006.01) |
|---|---|
| G08G 1/0967 | (2006.01) |
| G01C 21/36 | (2006.01) |
| G06Q 40/00 | (2012.01) |
| G09B 9/04 | (2006.01) |

(52) U.S. Cl.
CPC ....... *G08G 1/0967* (2013.01); *G01C 21/3691* (2013.01); *G01C 21/3697* (2013.01)

(58) Field of Classification Search
CPC .............. G08G 1/0967; G01C 21/3691; G01C 21/3697
USPC ....................................................... 340/905
See application file for complete search history.

(56) References Cited

U.S. PATENT DOCUMENTS

| 2009/0040054 A1* | 2/2009 | Wang ................. B60W 30/095 340/576 |
|---|---|---|
| 2013/0302758 A1* | 11/2013 | Wright .................. G07C 5/008 434/65 |
| 2014/0172467 A1* | 6/2014 | He ....................... B60K 28/066 705/4 |
| 2016/0117947 A1* | 4/2016 | Misu ....................... G09B 9/04 434/62 |
| 2017/0132924 A1* | 5/2017 | Tanaka ................ G08G 1/0967 |

FOREIGN PATENT DOCUMENTS

| JP | 2009-026157 A | 2/2009 |
|---|---|---|
| JP | 2009-032181 A | 2/2009 |
| JP | 2009-146254 A | 7/2009 |

* cited by examiner

*Primary Examiner* — Jack K Wang
(74) *Attorney, Agent, or Firm* — Oliff PLC

(57) ABSTRACT

A driving support device is connected with a control device, a positioning unit and a driver-state detection device, and communicates with dangerous-spot analysis device, the control device outputting a behavior signal indicating that a dangerous behavior of a vehicle occurred, the dangerous-spot analysis device outputting driver information indicating a state of a driver of the vehicle, the dangerous-spot analysis device. The driving support device includes: a dangerous-spot notification unit; a state judgment unit that acquires the driver information from the driver-state detection device and that judges whether the state of the driver is a state of increasing a risk, based on the driver information; and a warning unit that warns in a case where there is a possibility of passing through the risky spot specified by the dangerous-spot analysis device and where the state judgement unit judges that the state of the driver is the state of increasing the risk.

10 Claims, 7 Drawing Sheets

FIG.5

| SPOT | DATE AND TIME | WEATHER | STATE OF DRIVER |
|---|---|---|---|
| ... | ... | RAINY | ... |
| ... | ... | CLOUDY | ... |
| ... | ... | ... | ... |

FIG.6

| SPOT | WEATHER | DANGER DEGREE |
|---|---|---|
| ... | RAINY | 30 |
| ... | CLOUDY | 10 |
| ... | ... | ... |

DRIVING SUPPORT DEVICE

CROSS-REFERENCE TO RELATED APPLICATIONS

This application is based upon and claims the benefit of prior Japanese Patent Application No. 2015-221496 filed on Nov. 11, 2015, the entire contents of which are incorporated herein by reference.

FIELD

The present invention relates to a driving support device.

BACKGROUND

Conventionally, there has been a technology in which a bad-running spot is created by a center, is sent to a vehicle, and is displayed on a car navigation before the arrival at the spot (for example, Patent document 1). Specifically, the center creates a shade information map in which a road condition for the formation of black ice is registered, by using the weather information and shade information that are sent from vehicles. Then, whether a request of the bad-running information sent from a vehicle is an object of the bad-running spot is discriminated by using the shade information map, and the bad-running information is sent to the vehicle. The vehicle displays a freeze warning on the car navigation before the arrival at the bad-running spot, and calculates a route on which there are few bad-running spots, in a route search using the car navigation.

Further, there has been also proposed a technology of judging the possibility of the slip of a vehicle (for example, Patent document 2). Specifically, a center-side device that receives slip position and slip-related vehicle information (for example, tire type) as slip information sends the slip information to a vehicle-side device mounted on a different vehicle. The vehicle on which a vehicle-side device is mounted acquires the slip-related vehicle information on the slipped vehicle, in addition to the position when the different vehicle slipped. Therefore, it is possible to judge whether the own vehicle slips at the position where the different vehicle slipped, in consideration of the slip-related vehicle information.

[Patent document 1] Japanese Patent Laid-Open No. 2009-26157

[Patent document 2] Japanese Patent Laid-Open No. 2009-32181

SUMMARY

Technical Problem

Conventionally, there has been proposed a technology of warning a vehicle of the approach to a dangerous spot. However, in a case where a driver drives carefully in preparation for danger, the dangerousness of passing through the spot is relatively low, and the driver is likely to get a feeling that the warning is bothersome.

Hence, the present invention has an object to provide a technology of determining whether to warn of the approach of the vehicle to the dangerous spot, in the light of the state of the driver.

Solution to Problem

A driving support device is connected with control device, a positioning unit and a driver-state detection device, and communicates with dangerous-spot analysis device, the control device outputting a behavior signal indicating that a dangerous behavior of a vehicle occurred, the positioning unit acquiring positional information on the vehicle, the dangerous-spot analysis device outputting driver information indicating a state of a driver of the vehicle, the dangerous-spot analysis device specifying a risky spot based on dangerous-spot information that is sent from a plurality of vehicles, the dangerous-spot information containing positional information on a spot where a dangerous behavior occurred. The driving support device includes: a dangerous-spot notification unit that acquires the behavior signal from the control device and that sends the dangerous-spot information to the dangerous-spot analysis device; a state judgment unit that acquires the driver information from the driver-state detection device and that judges whether the state of the driver is a state of increasing a risk, based on the driver information; and a warning unit that warns of approach to the risky spot in a case where there is a possibility of passing through the risky spot specified by the dangerous-spot analysis device and where the state judgement unit judges that the state of the driver is the state of increasing the risk.

Further, the dangerous-spot notification unit may send, to the dangerous-spot analysis device, the dangerous-spot information further containing date-and-time information indicating a date and time when the dangerous behavior occurred, the dangerous-spot analysis device may acquire information indicating weather at the spot at the date and time when the dangerous behavior occurred, and may specify the risky spot in association with the weather, and the warning unit may warn of the approach to the risky spot in a case where there is a possibility of passing through the risky spot in the weather specified by the dangerous-spot analysis device and where the state judgment unit judges that the state of the driver is the state of increasing the risk.

Further, the dangerous-spot notification unit may send, to the dangerous-spot analysis device, the dangerous-spot information further containing data indicating the state of the driver at a time point when the dangerous behavior occurred, the dangerous-spot analysis device may specify the risky spot in association with the data indicating the state of the driver at the time point when the dangerous behavior occurred, and the warning unit may warn of the approach to the risky spot in a case where there is a possibility of passing through the risky spot and where the state of the driver during running is the same as the state of the driver at the time point when the dangerous behavior occurred.

The behavior signal may be at least one of a signal indicating that a tire span, a signal indicating that an ABS (Antilock Brake System) was actuated, a signal indicating that an ESC (Electronic Stability Control) was actuated, a signal indicating that a TCS (Traction Control System) was actuated, and a torque control signal of a four-wheel-drive vehicle.

Further, the driver-state detection device may be a photographing device that photographs the driver, and the state judgment unit may judge that the state of the driver is the state of increasing the risk, in a case where a predetermined action of the driver is detected.

Further, the driver-state detection device may be a voice input device, and based on data acquired from the voice input device, the state judgment unit may judge that the state of the driver is the state of increasing the risk, in a case where a driver's conversation or a driver's speech containing a predetermined word is detected.

Further, the driver-state detection device may be a pedal stroke sensor that is provided on an accelerator pedal or a brake pedal, and based on data acquired from the pedal stroke sensor, the state judgment unit may judge that the state of the driver is the state of increasing the risk, in a case where a sudden starting or a sudden braking beyond a predetermined reference is detected.

Further, the driver-state detection device may be a device that monitors information about ride of the driver, and based on a regularity about the ride of the driver, the state judgment unit may judge that the state of the driver is the state of increasing the risk, in a case where the ride during running deviates from the regularity by a predetermined reference or more.

Further, the warning unit may warn repeatedly, in a case where there is a possibility of passing through the risky spot specified by the dangerous-spot analysis device and where the state of the driver continues to be the state of increasing the risk, and may warn more strongly, in a case of approach to less than a predetermined reference from the risky spot.

Here, the contents described in Means for solving the Problem can be combined as possible in a range without departing from the problems and technical idea in the present invention. Further, the contents in Means for solving the Problem may be provided as methods that are executed by circuits.

Advantageous Effect of Invention

It is possible to determine whether to warn of the approach of the vehicle to the dangerous spot, in the light of the state of the driver.

BRIEF DESCRIPTION OF DRAWINGS

FIG. 5 is a table illustrating an example of the information that is accumulated in a dangerous-spot analysis device.

FIG. 6 is a table illustrating an example of the information that is generated by the dangerous-spot analysis device.

DESCRIPTION OF EMBODIMENTS

Figure 1:
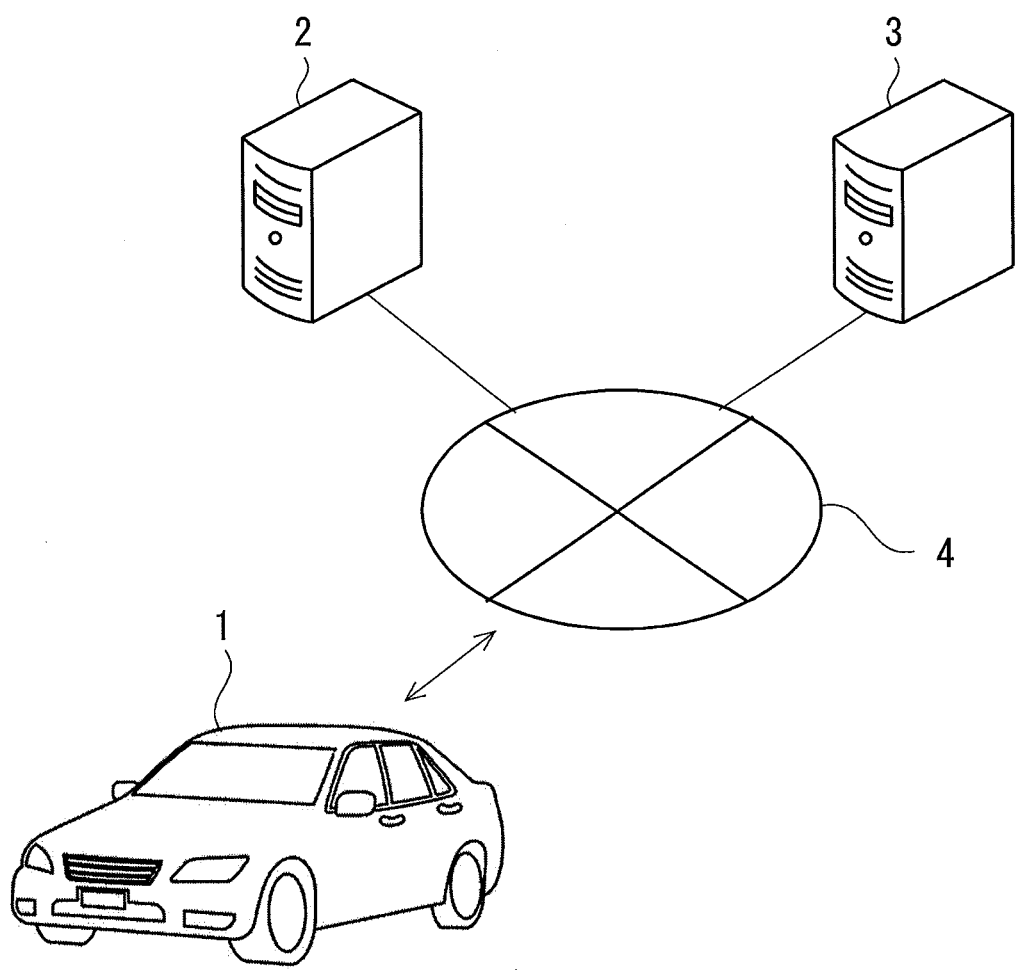
FIG. 1 is a constitution diagram illustrating an example of a dangerous-spot warning system.

Hereinafter, descriptions will be made with reference to the accompanying drawings. Preferable embodiments of the present invention are illustrated in the drawings. However, the present invention can be carried out in many different modes, and is not limited to embodiments described in the present description.

<System Constitution>

FIG. 1 is a constitution diagram illustrating an example of a dangerous-spot warning system according to the embodiment. The system includes a vehicle 1 on which a driving support device is mounted, a dangerous-spot analysis device 2, and a weather-information delivery device 3, and they are connected through a network 4. The vehicle 1 detects the occurrence of a slip or the like, and sends the positional information on the occurrence spot and the date and time, to the dangerous-spot analysis device 2. Here, one or more vehicles 1 are connected with the system. Using the positional information on the spot where the slip or the like occurred and the date and time, the dangerous-spot analysis device 2 acquires the information about the weather at the spot, from the weather-information delivery device 3, and accumulates the acquired information. Further, the dangerous-spot analysis device 2 evaluates the degree of danger at which the slip or the like occurs at the spot in a certain weather. Further, the driving support device of the vehicle 1 outputs a warning, depending on the state of the driver, in the case where, on the running course ahead, there is a spot for which the degree of the danger of the slip or the like is equal to or more than a predetermined threshold value in the weather at the time point of the running.

<Device Constitution>

Figure 2:
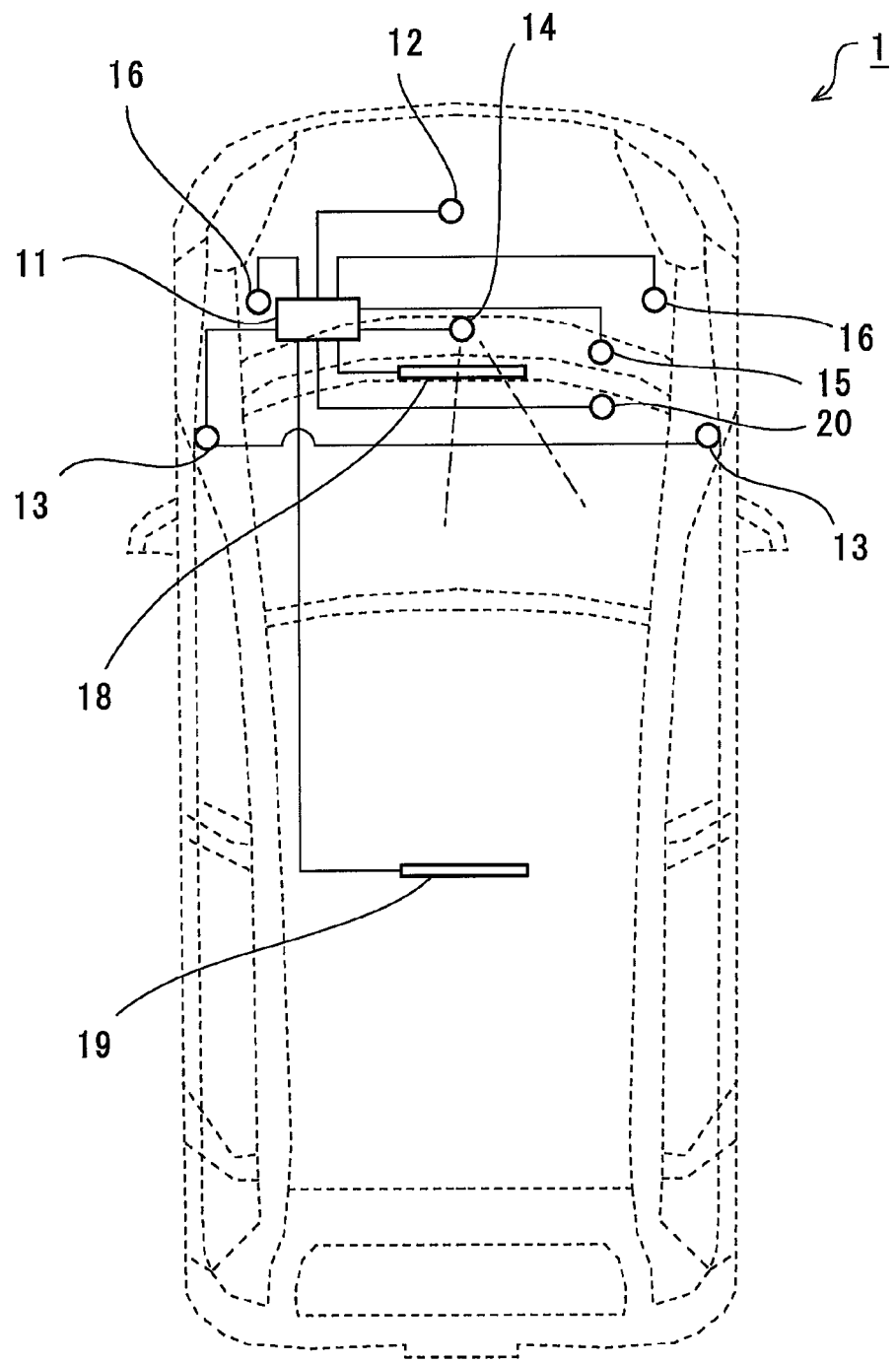
FIG. 2 is a diagram schematically illustrating a constitution of a vehicle on which a driving support device is mounted.

FIG. 2 is a diagram schematically illustrating a constitution of the vehicle on which the driving support device according to the embodiment is mounted. In FIG. 2, broken lines illustrate the vehicle 1, and solid lines illustrate constituents included in the vehicle 1 and the connection relation of them. The vehicle 1 includes a driving support device 11, a GPS (Global Positioning System) unit 12, a running control device 13, a driver photographing device 14, a voice input device 15, a voice output device 16, a ride monitoring unit 17, a display device 18, a rear-seat display device 19, and a pedal stroke sensor 20. Here, some constituents such as, for example, the voice output device 16 and the rear-seat display device 19 may be excluded.

Figure 3:
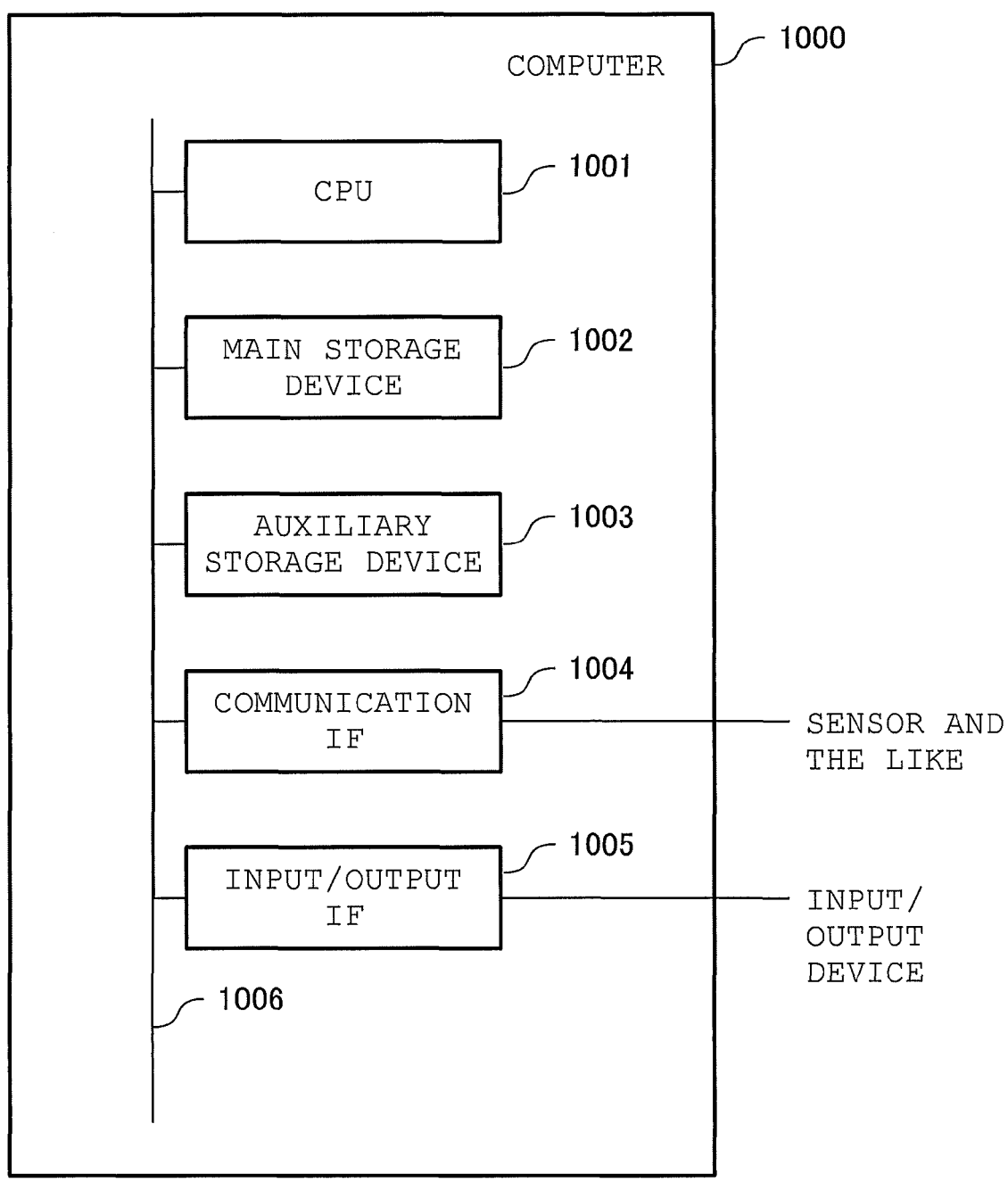
FIG. 3 is a device constitution diagram illustrating an example of a computer.

The driving support device 11 is a so-called computer. FIG. 3 is a device constitution diagram illustrating an example of the computer. A computer 1000 illustrated in FIG. 3 includes a CPU (Central Processing Unit) 1001, a main storage device 1002, an auxiliary storage device 1003, a communication IF (Interface) 1004, an input/output IF (Interface) 1005, and a communication bus 1006. The CPU 1001 performs processes and the like according to the embodiment, by executing a program (also referred to as "software" or "application"). The main storage device 1002 caches the program and data read by the CPU 1001, and reserves the working area for the CPU. Specifically, the main storage device is a RAM (Random Access Memory), a ROM (Read Only Memory) or the like. The auxiliary storage device 1003 stores the program to be executed by the CPU 1001, the setting information for operation, and the like. Specifically, the auxiliary storage device 1003 is an HDD (Hard-disk Drive), an SSD (Solid State Drive), an eMMC (embedded Multi-Media Card), a flash memory, or the like. The communication IF 1004 communicates with the dangerous-spot analysis device 2 through the network 4. Specifically, the communication IF 1004 is a wireless communication module that communicates based on a predetermined standard. The input/output IF 1005 is connected with other sensors and devices, and performs the input and output of data. Then, the above-described constituent elements are connected by the communication bus 1006. Here, for each of the constituent elements, a plurality of constituent elements may be provided, or some of the constituent elements do not need to be provided. Then, the CPU 1001 executes the program, and thereby, makes the computer in FIG. 3 work as the driving support device 11.

The GPS unit 12 includes a receiver that receives signals from GPS satellites, and calculates the positional information on the GPS unit 12 (therefore the vehicle 1), based on the received signals.

The running control device 13 is a device that controls or detects the behavior of the vehicle 1 about running. For example, the running control device 13 is an ABS (Antilock Brake System), an ESC (Electronic Stability Control), a TCS (Traction Control System), a torque control device for a four-wheel-drive vehicle, a device that detects the spin of a tire, or the like. The ABS is a device that automatically performs pumping braking in order to prevent the slip of a tire. The ESC is a device that stabilizes the attitude of the vehicle in order to prevent the sideslip of the vehicle. The TCS is a device that regulates the drive power of the tire in order to prevent the spin of the tire at the starting or accelerating time. Further, the torque control device for the four-wheel-drive vehicle is a device that changes the torques of the front and rear wheels depending on the condition of the slip of the tire and the like. Further, the device that detects the spin of the tire, for example, is a device that detects the spin based on the speed of the vehicle and the rotation speed of the tire. These devices, which are electrically controlled, respectively output a signal indicating that the ABS was actuated, a signal indicating that the ESC was actuated, a signal indicating that the TCS was actuated, a torque control signal of the four-wheel-drive vehicle, a signal indicating that the tire span, and the like. Further, these signals correspond to the behavior signal indicating that the dangerous behavior of the vehicle occurred in the present invention.

The driver photographing device 14 is a so-called camera, and continuously outputs photographed images. Further, chain lines illustrated in FIG. 2 indicate an approximate photographing range (that is, a viewing angle). In the embodiment, a driver at the driver seat is contained in the photographing range of the driver photographing device 14. Further, the driving support device 11 may detect a predetermined action of the driver, using the image photographed by the driver photographing device 14. Here, in the embodiment, a so-called video also, which is expressed by a plurality of images to be updated in time series, is referred to as an image.

The voice input device 15 is an input device such as a microphone, and for example, acquires the driver's voice to output it to the driving support device 11. The voice output device 16 is an output device such as a speaker, and the driving support device 11 may output a voice warning or the like to the driver through the voice output device 16.

The ride monitoring unit 17 is a data logger that records the operation for the vehicle 1, and monitors the opening/closing of a door of the vehicle 1, or the initiation of an engine switch such as accessary (ACC), ignition (IG) and start, or monitors the opening/closing of a door, to notify the driving support device 11. The driving support device 11 can accumulate the history of the operation such that it is associated with the date and time, and can learn the statistical regularity about the ride.

The display device 18 is a so-called car navigation system of a fixed type, a portable-type navigation device, portable equipment such as a smartphone, a head-up display that projects a video on a windshield or the like, or others. The display device 18 receives the output from the driving support device 11, and displays a warning in the case of the approach to a spot that has a danger of a slip or the like. Here, the display device 18 may be a constituent that is integral with the driving support device 11.

The rear-seat display device 19 is a display device such as a liquid-crystal monitor, which is provided such that a passenger at a rear seat can see it. The driving support device 11 may output information on the rear-seat display device 19.

The pedal stroke sensor 20 is provided on the accelerator pedal or the brake pedal, and can measure the speed of pedal depression. Based on the output of the pedal stroke sensor, the driving support device 11 can detect a sudden starting or a sudden braking.

<Functional Constitution>

Figure 4:
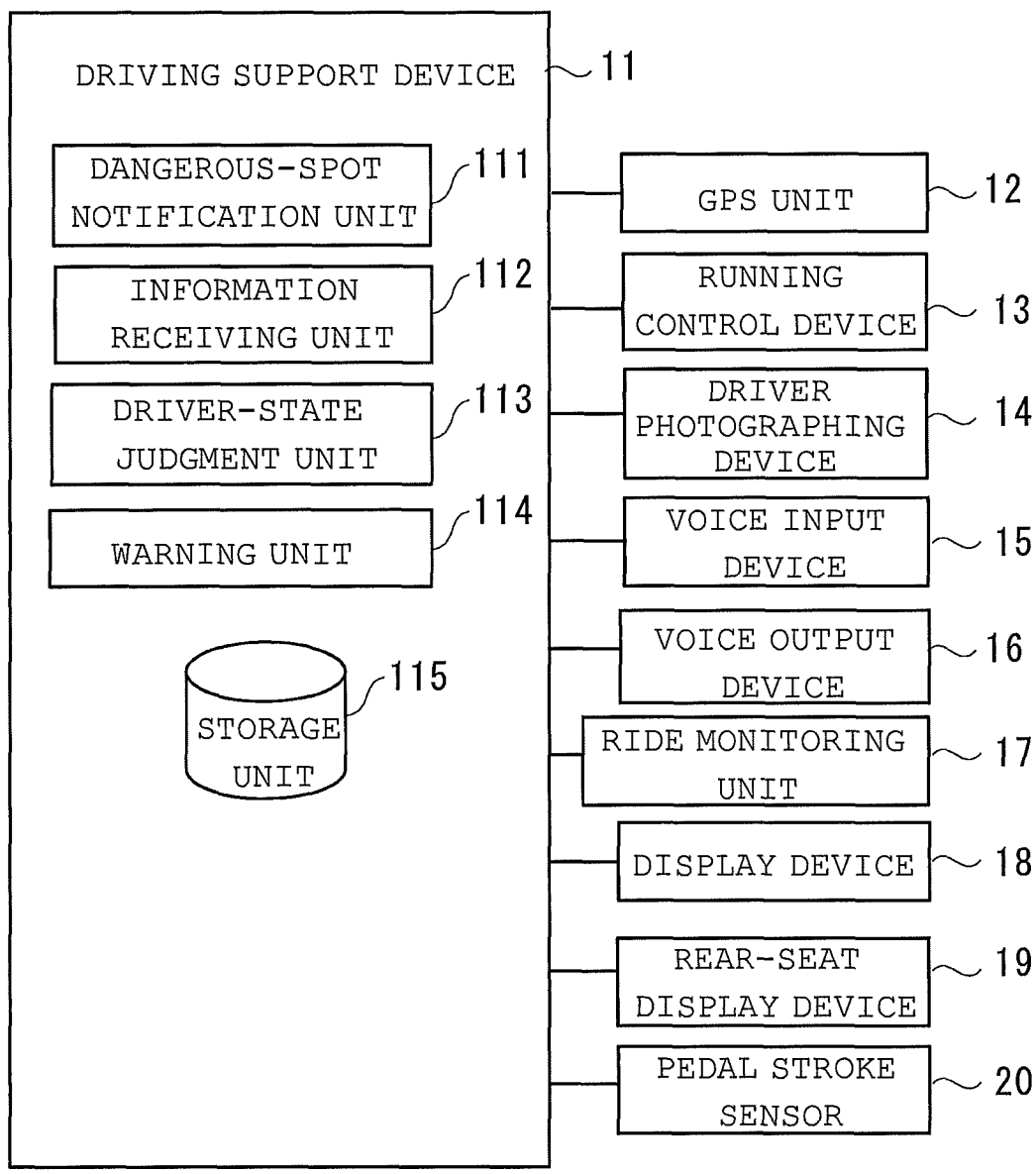
FIG. 4 is a functional block diagram illustrating an example of the driving support device.

FIG. 4 is a functional block diagram illustrating an example of the driving support device 11. The driving support device 11 includes a dangerous-spot notification unit 111, an information receiving unit 112, a driver-state judgment unit 113, a warning unit 114, and a storage unit 115. Here, the above-described CPU 1001 of the driving support device 11 executes a predetermined program, and thereby, can make the driving support device 11 work as the function units illustrated in FIG. 4.

The dangerous-spot notification unit 111 receives the behavior signal indicating that a dangerous behavior of the vehicle occurred, from the running control device 13, and specifies the positional information on a spot where the dangerous behavior occurred, based on the positional information evaluated by the GPS unit 12. That is, the dangerous-spot notification unit 111 receives the signal indicating that the slip of the tire of the vehicle 1 occurred, or that the slip could occur, from the ABS, the ESC, the TCS, the torque control device for the four-wheel-drive vehicle, the device that detects the spin of the tire, or the like, and acquires the positional information on the spot. Further, the dangerous-spot notification unit 111 sends at least the specified positional information and the date and time when the dangerous behavior of the vehicle occurred, to the dangerous-spot analysis device 2 through the network 4. Here, it is allowed to send the later-described information indicating the state of the driver, together. Further, it is allowed to continuously send the positional information on the vehicle 1 or the information indicating a planned running course to the dangerous-spot analysis device 2, independently of the notification of the dangerous spot. Here, the planned running course is determined, for example, based on a course to a destination that is set in the car navigation system included in the vehicle 1.

Meanwhile, the dangerous-spot analysis device 2 receives the information, and accumulates the information in a storage device (not illustrated). On this occasion, the information indicating the weather at the spot at the date and time is acquired from the weather-information delivery device 3 through the network 4, based on the date-and-time information and the positional information, and is accumulated so as to be associated with the date-and-time information and the positional information. The information illustrated in FIG. 5 is stored in the storage device. The example in FIG. 5 includes the items of spot, date and time, weather and state of driver. Here, the item of state of driver may be excluded, and other information may be included.

Further, the dangerous-spot analysis device 2 evaluates the danger degree at each spot, based on the accumulated information. On this occasion, the danger degree for each weather may be evaluated. The danger degree is stored in a table illustrated in FIG. 6. The example in FIG. 6 includes the items of spot, weather and danger degree. The value of the danger degree is calculated based on a predetermined algorithm, using the information about slip that is collected from a plurality of vehicles. Here, the danger degree does not need to be calculated for each weather. Further, the danger degree may be calculated in units of state of driver or other information, in addition to the item of weather or instead of the item of weather. As the other information, time zone, season or the like may be used. Thereby, it is possible to compare danger degrees under similar conditions. The information on the danger degree is delivered to each vehicle, for example, in a case of exceeding a predetermined threshold value. The information on the danger degree may be delivered in a case where the vehicle approaches to the spot, and further, may be delivered in a case where the weather at the spot at the time point of the running of the vehicle coincides with the stored weather. Based on the positional information or the information indicating the planned running course, which is continuously received from the vehicle 1, the dangerous-spot analysis device 2 extracts the information about a dangerous spot through which the vehicle 1 is likely to pass, and sends the information to the vehicle 1.

Meanwhile, the information receiving unit 112 of the driving support device 11 receives, for example, the information indicating the positional information and danger degree of the dangerous spot where the slip can occur, from the dangerous-spot analysis device 2 through the network 4. For example, the information on spots on the course to a destination set in the car navigation system of the vehicle 1 or the information on spots on a road on which the vehicle 1 is running may be received. For example, the information equivalent to one record of the table illustrated in FIG. 6 is received. Further, the received information is stored in the storage unit 115.

The driver-state judgment unit 113 acquires the information about the driver, from the driver photographing device 14, the voice input device 15, the ride monitoring unit 17, the pedal stroke sensor 20 or the like, and judges whether the driver is in a predetermined state of increasing the risk. Here, the driver photographing device 14, the voice input device 15, the ride monitoring unit 17, the pedal stroke sensor 20 or the like is referred to as a driver-state detection device. Further, the information about the driver that is acquired from the driver-state detection device is referred to as driver information. Further, the state of increasing the risk means a state in which the driver's attention is estimated to be scattered, or the like.

Figure 7:
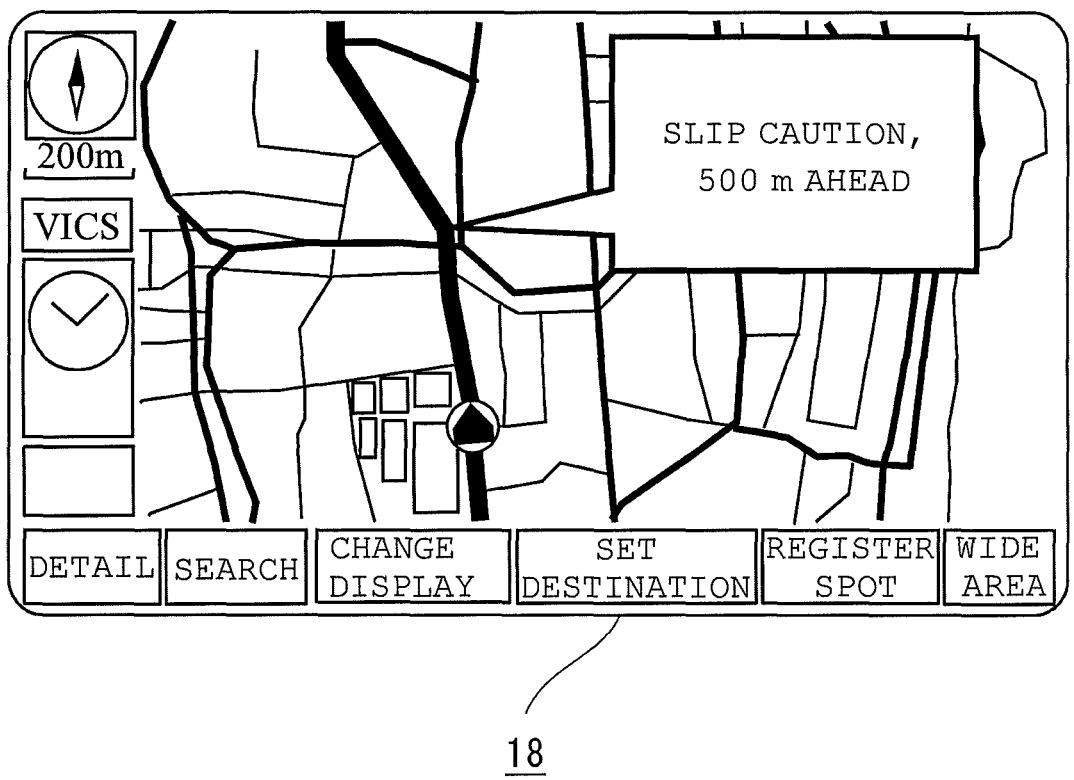
FIG. 7 is an example of a warning screen indicating a dangerous spot on a map.

Further, in the case of the approach to the dangerous spot, the warning unit 114 outputs, to the display device 18, a warning with a letter, a figure, a symbol, a video or the like, when it is judged that the driver is in the state of increasing the risk. Further, in a case where it is judged that the driver is not looking forward based on the image of the driver photographed by the driver photographing device 14, a warning with a voice may be output from the voice output device 16, in addition to the display device 18 or instead of the display device 18. FIG. 7 is an example of a warning screen indicating a dangerous spot on a map. The example of FIG. 7 illustrates that there is a spot where caution should be exercised not to cause a skid, on the running course.

Thus, whether to output the warning is determined based on the judged state of the driver, and thereby, for example, in a case where the driver is driving with enough care, it is possible to avoid the output of the warning, which is bothersome to the driver. Therefore, it is possible to output the warning at an appropriate timing, without causing the drive discomfort.

<Behavior Notification Process>

Figure 8:
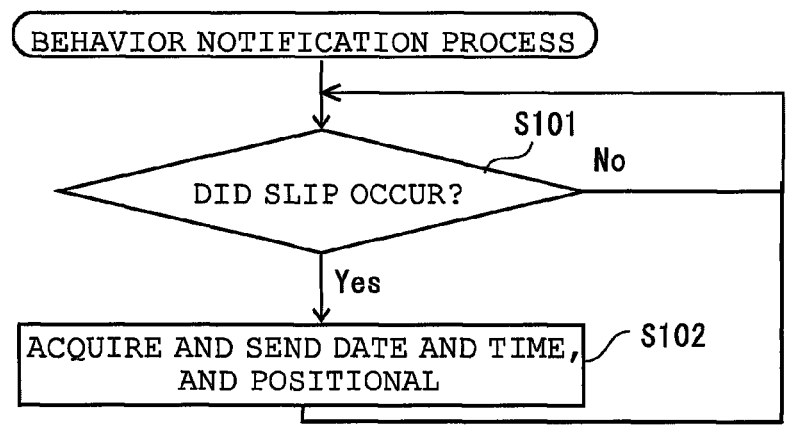
FIG. 8 is a process flow diagram illustrating an example of a behavior notification process.

FIG. 8 is a process flow diagram illustrating an example of a behavior notification process by which the information on the dangerous spot is sent from the vehicle 1 to the dangerous-spot analysis device 2 in the case where the slip of the vehicle 1 occurred, or other cases.

The dangerous-spot notification unit 111 of the driving support device 11 judges whether the slip of the vehicle occurred (FIG. 8: S101). In the step, the dangerous-spot notification unit 111 judges whether the signal indicating that the ABS, the ESC, the TCS, the torque control device for the four-wheel-drive vehicle, the device that detects the spin of the tire, or the like was actuated is received. Here, in the case where it is judged that the signal is not received, the judgment is continued back to the process of S101.

On the other hand, in the case where the above-described signal is received, it is judged that the slip of the vehicle occurred or could occur (S101: Yes). Then, the dangerous-spot notification unit 111 sends, to the dangerous-spot analysis device 2, at least the date and time of the slip occurrence or the like and the positional information on the spot of the slip occurrence or the like.

By the above process, the information indicating the spot where the dangerous behavior of the vehicle 1 occurred is sent from a plurality of vehicles 1 to the dangerous-spot analysis device 2. The information illustrated in FIG. 5 is accumulated in the dangerous-spot analysis device 2. Further, as described above, the dangerous-spot analysis device 2 specifies the risky spot, using an existing technology. On this occasion, the dangerous-spot analysis device 2 may calculate the degree of the risk such that it is linked with the weather at the time of running, or may calculate the degree of the risk such that it is linked with the time zone or season at the time of running. For example, the information illustrated in FIG. 6 is generated. The characteristic of an object spot, as exemplified by a rough road on which fallen leaves or gravel stones are deposited, and a lot of remaining snows, ices or puddles, is evaluated as the degree of the risk that is statistically calculated.

<Warning Process>

Figure 9:
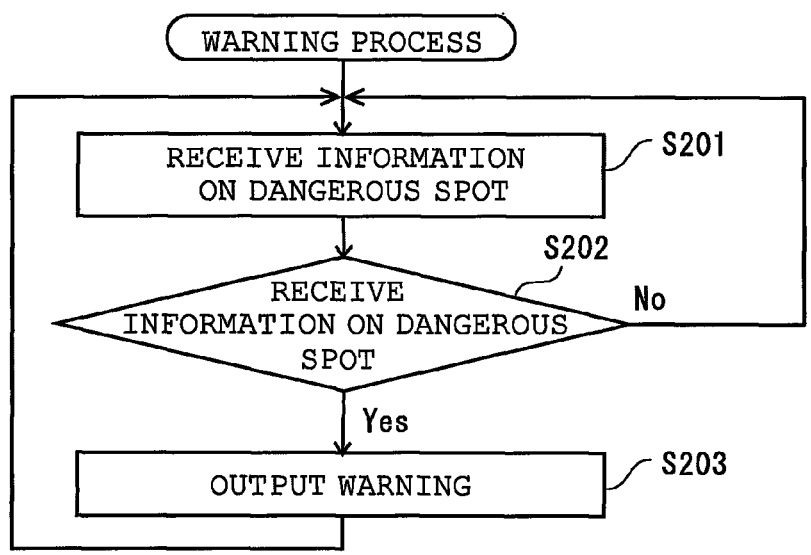
FIG. 9 is a process flow diagram illustrating an example of a warning process.

FIG. 9 is a process flow diagram illustrating an example of a warning process by which the driving support device 11 warns the driver of the approach to the dangerous spot.

The information receiving unit 112 of the driving support device 11 receives, from the dangerous-spot analysis device 2, the information indicating that the vehicle 1 approaches to a predetermined dangerous spot on the running course (FIG. 9: S201). Here, for example, the driving support device 11 continuously sends its own positional information to the dangerous-spot analysis device 2, and the dangerous-spot analysis device 2 can specify the vehicle 1 that approaches to the dangerous spot. Further, the warning process is triggered by the receiving of the information from the dangerous-spot analysis device 2, illustrated in S201, and is started on the side of the driving support device 11.

Further, the driver-state judgment unit 113 of the driving support device 11 judges whether the state of the driver is a predetermined state of increasing the risk (S202). In the step, the driver-state judgment unit 113 acquires the information on the driver from the driver-state detection device, and judges the state of the driver based on the acquired information. In the embodiment, the photographed image of the driver is acquired from the driver photographing device 14, which is an example of the driver-state detection device. In this case, for example, the driver's sight line or gaze point is specified.

Here, for the specification of the sight line or gaze point, various existing technologies can be applied. For example, in the image photographed by the driver photographing device 14, the gaze point may be evaluated, based on the positional relation of the iris in which the inner corner of the driver's eye is adopted as the reference. Further, it is allowed to use an ECQ method in which the electric potential difference between the cornea side and retina side on the surface of the eye ball is utilized, a search coil method in which a contact lens including a coil is used in a magnetic field and the electric current is measured, a sclera reflection method in which the difference in optical reflectance between the cornea and the sclera is utilized, an cornea reflection method in which the eye ball is irradiated with near infrared light and the positional relation between a bright point (Purkinje image) generated on the cornea surface and the pupil is utilized, or the like. Further, the driver-state judgment unit 113 may specify the orientation of the whole face of the driver, based on the image. The driver photographing device 14 may be provided in the vehicle 1, or may be worn by the driver.

Then, in the case where the driver is not looking forward, the driver-state judgment unit 113 judges that the state of the driver is the state of increasing the risk (S202: YES). Here, it may be judged to be the state of increasing the risk, in a case where the driver is not looking forward for a predetermined period or more.

Thereafter, the warning unit 114 of the driving support device 11 outputs the warning to the driver through the display device 18 (S203). In the step, for example, as illustrated in FIG. 7, the dangerous spot is indicated on the map, and a text expressing the approach to the dangerous spot is displayed. The warning may be output as a letter, a figure, a symbol, a video or the like, and a voice may be concurrently output from the voice output device 16.

Further, in the case where it is judged to be not the state of increasing the risk in S202 (S202: NO), or after S203, the process is continued back to S201. That is, in the case where the state of increasing the risk is continued, the output of the warning in S203 is repeated until the arrival at the dangerous spot.

When the warning is displayed only in the case where the driver is in the state of increasing the state as described in the embodiment, the warning can be appropriately given to the driver in the condition in which attention should be invited, and the warning, which is bothersome to the driver, is not displayed, in the condition in which the driver is carefully driving.

<Modification 1>

In S202, the process of judging the state of the driver is not limited to whether the driver is carefully looking forward. For example, using an existing action detection technology, a predetermined action of the driver may be detected based on the image acquired from the driver photographing device 14. For example, when a situation in which the driver taps on the steering wheel, a situation in which the driver bites the nail, a situation in which the driver sways the body, a situation in which the driver smokes a cigarette, or the like is detected at a frequency of a predetermined threshold value or higher, it may be judged that the driver is in the state of increasing the risk.

<Modification 2>

Further, in S202, the process of judging the state of the driver is not limited to the mode of using the image. For example, the voice in the vehicle may be acquired from the voice input device 15, which is an example of the driver-state detection device. In this case, the driver-state judgment unit 113 may judge that the driver is in the state of increasing the risk, for example, when a voice louder than a predetermined threshold value is acquired, when speakers are discriminated based on voiceprints or the like and it is judged that the number of persons having a conversation is more than a predetermined threshold value, when speakers are specified using a directional microphone and the number of speeches of the driver exceeds a predetermined threshold value, or when a predetermined word or sentence expressing impatience or irritation is recognized as a result of the processing of the driver's speech by an existing voice recognition technology.

<Modification 3>

Further, the depression speed of the accelerator pedal or the brake pedal may be acquired from the pedal stroke sensor 20, which is an example of the driver-state detection device. In this case, it is judged to be the sudden starting or sudden braking, for example, when the pedal is depressed at a speed exceeding a predetermined threshold value. Then, it is judged that the driver is in the state of increasing the risk, in a case where the frequency of the sudden starting or sudden braking is higher than a predetermined reference, or for a predetermined period from the last detection of the sudden starting or sudden braking. Here, it is allowed to be a constitution in which the displacement of the accelerator pedal or the brake pedal is acquired from the pedal stroke sensor 20 and the driver-state judgment unit 113 detects the sudden starting or sudden braking based on the displacement amount per unit time.

<Modification 4>

Further, as an example of the driver-state detection device, it is allowed to utilize a data logger that records the history about the operation for the vehicle 1 such as the opening/closing of the door of the vehicle and the initiation of the engine such that it is associated with the date and time. In this case, based on the history about the operation for the vehicle 1, the driver-state judgment unit 113 performs the machine learning of the regularity of the operation. The regularity, for example, the fact that the time when the vehicle 1 is used is roughly fixed for each day of the week, is learned, and is stored in the storage unit 115. Then, the driver-state judgment unit 113 judges that the driver is in the state of increasing the risk, in a case where it is judged that the date and time of the operation concerning the running at the time point of the processing deviates from the learned operation regularity by more than a predetermined threshold value. Particularly, it may be judged that the driver is in the state of increasing the risk, in a case where it is judged to be a predetermined time or more behind the learned departure time. Further, it may be judged that the driver is in the state of increasing the risk, in a case where the time after the driver opens the door and before the driver starts the vehicle (accelerator-on) is shorter than the learned time by a predetermined time or more.

<Other Modifications>

The judgment of whether the driver is in the state of increasing the risk may be performed by combining one or more of the above-described embodiment and modifications. Further, other than the case where the driving support device 11 receives the information on the dangerous spot, the process of judging the state of the driver may be executed continuously and repeatedly, and the latest judgment result may be used in S202 of FIG. 9. Thereby, the driving support device 11 can display the warning promptly after receiving the information on the dangerous spot.

Further, in the case where the process of S203 of FIG. 9 is repeated and where the driving support device 11 continues to output the warning, the strength of the warning may be gradually changed. For example, with the approach to the dangerous spot, the display of the warning on the display device 18 may be enlarged, or the color or motion of the display may be changed. Further, in addition to the output on the display device 18, the warning may be performed by a voice from the voice output device 16, for example, in a case of the approach to the dangerous spot beyond a predetermined threshold value.

Further, the warning unit 114 may perform the warning with a voice from the voice output device 16, in the case where it is judged that the driver is not looking forward based on the image of the driver that is photographed by the driver photographing device 14. Similarly, the display may be performed on the display device 18 promptly when it is judged that the driver has looked forward. Thereby, it is possible to perform the display promptly when the user has paid attention forward.

Further, the warning unit 114 may display the warning also for a passenger at the rear seat, through the rear-seat display device 19, in the case where the voice is acquired through the voice input device 15 or the like and where the driver has a conversation. Thereby, even when the driver is not looking forward, there is a possibility that the passenger can create awareness.

In the above-described example, the information about the dangerous spot is received from the dangerous-spot analysis device 2, whenever the vehicle 1 approaches to the dangerous spot. However, the information on the dangerous spot illustrated in FIG. 6 may be previously stored in the driving support device 11. Thereby, the driving support device 11 can detect the approach to the dangerous spot, without communicating with the dangerous-spot analysis device 2. On the other hand, in the case where the information about the dangerous spot is received from the dangerous-spot analysis device 2 whenever the vehicle 1 approaches to the dangerous spot similarly to the above-described example, it is possible to perform the warning of the dangerous spot, based on the latest information, which is updated by the dangerous-spot analysis device 2. Further, in the case where the information on the dangerous spot is previously stored in the driving support device 11, the driving support device 11 may acquire the weather information at the running spot at the time point of the running, from the weather-information delivery device 3 through the network 4, and may perform the warning when the danger degree in the acquired weather exceeds a predetermined reference.

The present invention is not limited to the above-described embodiments, and alterations and combinations can be made in a range without departing from the spirit of the present invention.

REFERENCE SIGNS LIST

1 vehicle
11 driving support device
111 dangerous-spot notification unit
112 information receiving unit
113 driver-state judgment unit
114 warning unit
115 storage unit
12 GPS unit
13 running control device
14 driver photographing device
15 voice input device
16 voice output device
17 ride monitoring unit
18 display device
19 rear-seat display device
20 pedal stroke sensor
2 dangerous-spot analysis device
3 weather-information delivery device
4 network

The invention claimed is:

1. A driving support device that is connected with a control device, a positioning unit and a driver-state detection device and that communicates with a dangerous-spot analysis device, the control device outputting a behavior signal indicating that a dangerous behavior of a vehicle occurred, the positioning unit acquiring positional information on the vehicle, the driver-state detection device outputting driver information indicating a state of a driver of the vehicle, the dangerous-spot analysis device specifying a risky spot based on dangerous-spot information that is sent from a plurality of vehicles, the dangerous-spot information containing positional information on a spot where a dangerous behavior occurred, the driving support device comprising:
a dangerous-spot notification unit that acquires the behavior signal from the control device and that sends the dangerous-spot information to the dangerous-spot analysis device;
a state judgment unit that acquires the driver information from the driver-state detection device and that judges whether the state of the driver is a state of increasing a risk, based on the driver information; and
a warning unit that warns of approach to the risky spot in a case where there is a possibility of passing through the risky spot specified by the dangerous-spot analysis device and where the state judgment unit judges that the state of the driver is the state of increasing the risk, wherein
the driver-state detection device is a device that monitors information about rides of the driver, and
based on a regularity of previous rides of the driver, the state judgment unit judges that the state of the driver is the state of increasing the risk, in a case where a current ride deviates from the regularity of the previous rides of the driver by a predetermined value or more.

2. The driving support device according to claim 1, wherein
the dangerous-spot notification unit sends, to the dangerous-spot analysis device, the dangerous-spot information further containing date-and-time information indicating a date and time when the dangerous behavior occurred,
the dangerous-spot analysis device acquires information indicating weather at the spot at the date and time when the dangerous behavior occurred, and specifies the risky spot in association with the weather, and
the warning unit warns of the approach to the risky spot in a case where there is a possibility of passing through the risky spot in the weather specified by the dangerous-spot analysis device and where the state judgment unit judges that the state of the driver is the state of increasing the risk.

3. The driving support device according to claim 1, wherein
the dangerous-spot notification unit sends, to the dangerous-spot analysis device, the dangerous-spot information further containing data indicating the state of the driver at a time point when the dangerous behavior occurred,
the dangerous-spot analysis device specifies the risky spot in association with the data indicating the state of the driver at the time point when the dangerous behavior occurred, and the warning unit warns of the approach to the risky spot in a case where there is a possibility of passing through the risky spot and where the state of the driver during running is the same as the state of the driver at the time point when the dangerous behavior occurred.

4. The driving support device according to claim 1, wherein the behavior signal is at least one of a signal indicating that a tire span, a signal indicating that an ABS (Antilock Brake System) was actuated, a signal indicating that an ESC (Electronic Stability Control) was actuated, a signal indicating that a TCS (Traction Control System) was actuated, and a torque control signal of a four-wheel-drive vehicle.

5. The driving support device according to claim 1, wherein the driver-state detection device is a photographing device that photographs the driver, and the state judgment unit judges that the state of the driver is the state of increasing the risk, in a case where a predetermined action of the driver is detected.

6. The driving support device according to claim 1, wherein the driver-state detection device is a voice input device, and based on data acquired from the voice input device, the state judgment unit judges that the state of the driver is the state of increasing the risk, in a case where a driver's conversation or a driver's speech containing a predetermined word is detected.

7. The driving support device according to claim 1, wherein the driver-state detection device is a pedal stroke sensor that is provided on an accelerator pedal or a brake pedal, and based on data acquired from the pedal stroke sensor, the state judgment unit judges that the state of the driver is the state of increasing the risk, in a case where a sudden starting or a sudden braking beyond a predetermined reference is detected.

8. The driving support device according to claim 1, wherein the warning unit warns repeatedly, in a case where there is a possibility of passing through the risky spot specified by the dangerous-spot analysis device and where the state of the driver continues to be the state of increasing the risk, and warns more strongly, in a case of approach to less than a predetermined reference from the risky spot.

9. The driving support device according to claim 1, wherein the regularity of the previous rides of the driver is relevant to departure time of the vehicle in each day of week, the driver-state detection device monitors departure time in each day of week, and the state judgment unit judges that the state of the driver is the state of increasing the risk, in a case where the departure time monitored by the driver-state detection device is behind a departure time based on the regularity of the previous rides of the driver.

10. The driving support device according to claim 1, wherein the regularity of the previous rides of the driver is relevant to a time period after the driver opens a door and before the driver starts the vehicle, the driver-state detection device monitors the time period after the driver opens the door and before the driver starts the vehicle, and the state judgment unit judges that the state of the driver is the state of increasing the risk, in a case where the time period monitored by the driver-state detection device is shorter than a predetermined time period based on the regularity of the previous rides of the driver.

* * * * *